2 Sheets--Sheet 1.

W. J. B. MILLS.

Forms for Fitting Shoe-Uppers.

No. 6,235. Reissued Jan. 19, 1875.

Witnesses:

L. F. Brous,

A. P. Grant.

Inventor:

Wm. J. B. Mills.

by John A. Wiedersheim

Att'y.

W. J. B. MILLS.

Forms for Fitting Shoe-Uppers.

No. 6,235. Reissued Jan. 19, 1875.

Witnesses:
L. F. Brous,
A. P. Grant.

Inventor:
Wm. J. B. Mills.
by John A. Wiedersheim
Atty.

UNITED STATES PATENT OFFICE.

WILLIAM J. B. MILLS, OF PHILADELPHIA, PENNSYLVANIA.

IMPROVEMENT IN FORMS FOR FITTING SHOE-UPPERS.

Specification forming part of Letters Patent No. 156,935, dated November 17, 1874; reissue No. 6,235, dated January 19, 1875; application filed December 30, 1874.

*To all whom it may concern:*

Be it known that I, WILLIAM J. B. MILLS, of the city and county of Philadelphia, and State of Pennsylvania, have invented a new and useful Improvement in Fitting Boot and Shoe Uppers; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
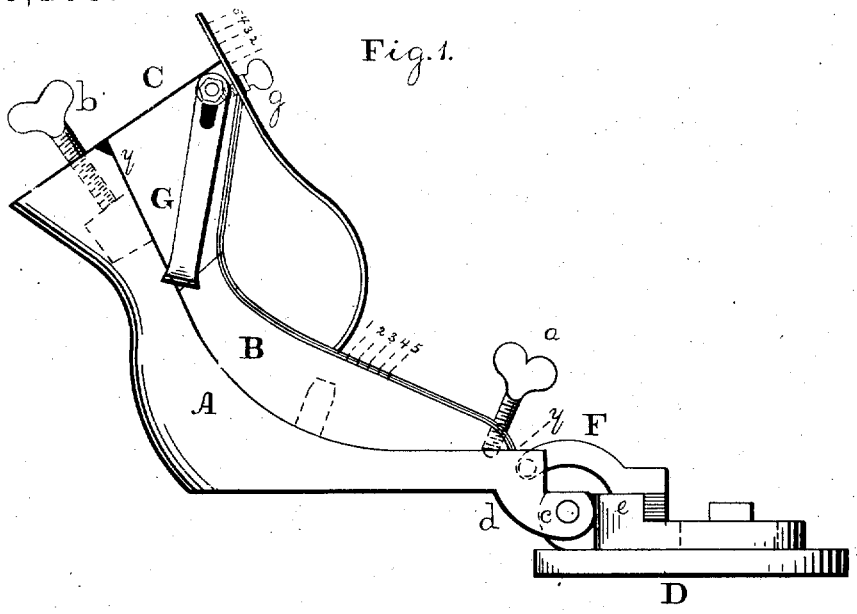
Figure 2:
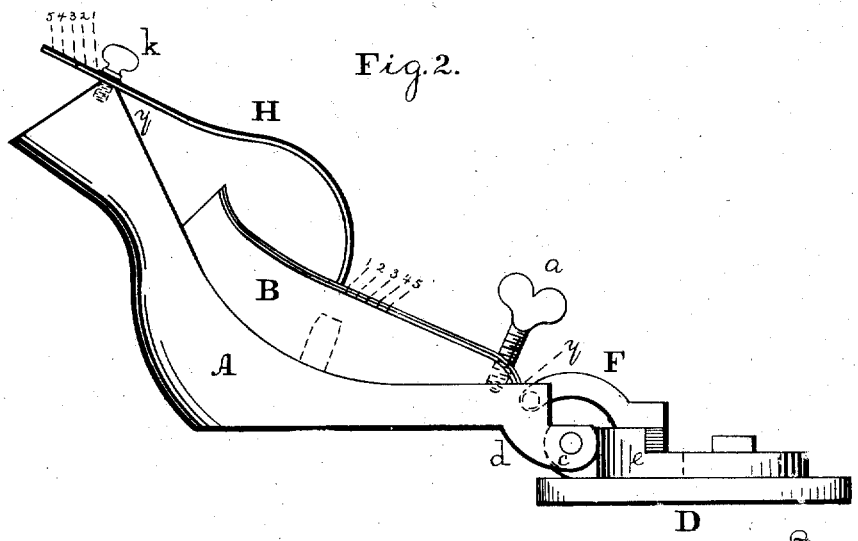
Figure 3:
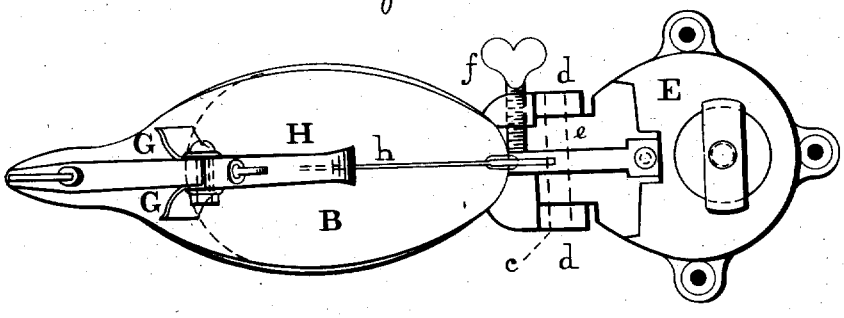
Figure 4:
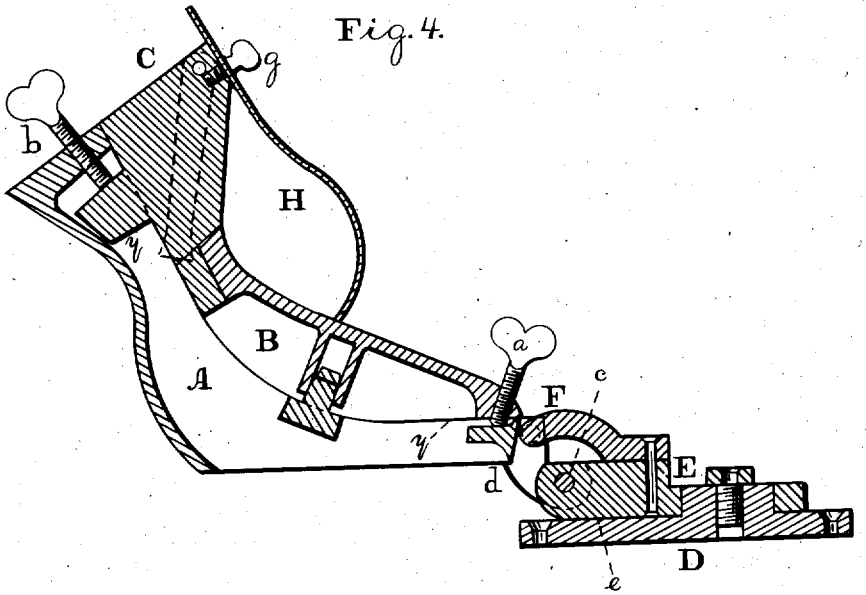
Figure 6:
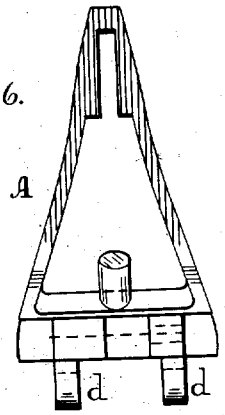
Figure 5:
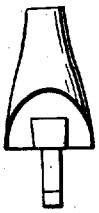

Figure 1 is a side elevation of a form and the jack with which it is connected. Fig. 2 is a similar view, a portion being removed. Fig. 3 is a plan view of Fig. 1. Fig. 4 is a vertical section in the line *x x*, Fig. 3. Fig. 5 is a front view of the cap-piece detached from the form. Fig. 6 is a front view of a detached portion.

Similar letters of reference indicate corresponding parts in the several figures.

My invention consists in fitting the parts of uppers of boots and shoes over a form, and holding them thereon while they are being pasted and adjusted. It also consists in placing the prepared quarters and linings over a form and adjusting them preparatory to stitching. It further consists in placing stitched quarters and linings over a form, and adjusting the vamp preparatory to stitching.

It is well known to manufacturers that none but experienced hands can fit the parts with any degree of accuracy, and that even with the best of operators the work is imperfectly pasted together and fitted, in consequence of having to bring the parts together upon a flat table; but in the use of my invention no difficulty whatever occurs, as the parts lie smoothly upon the form, whose shape is that of the upper to be made; consequently even inexperienced hands, with but little instruction, cannot fail to perform the work correctly and with dispatch, and as the parts all come together accurately upon the form, the uppers may be cut a half-size less than when fitted by the old method; hence there is a saving of a large amount of material.

The invention further consists in a form over which the uppers and linings are placed and held thereon while being shaped and vamped. It also consists in adapting the form to various sizes of boots and shoes. For this purpose the form is made adjustable, so as to correspond with either of the sizes within its range, and provided with a guide; and to cover joint, if desired, there may be thin flanges on one division to overlap the other. It further consists in dividing the upper piece at the neck, for the purpose of removing the upper part above the division when vamps are connected with the quarters, so as to give practicability to the removal of the uppers from the form when they are vamped, said upper piece or cap being provided with clasps and a guide. It also consists in a spring-clasp, to assist in holding the parts of the upper to the form, and serving as a guide for placing the vamp accurately upon the quarters, to give the proper lap. It also consists in side clasps as auxiliary to the front clasp. It finally consists in means for placing and holding the form at any desired height.

Referring to the drawings, A represents the lower and rear part of the form, having the front piece B and cap C fitted thereto at the line *y y*, and connected so as to be capable of expansion and contraction, to suit different sizes or variations in measurement, the pieces being held in their adjusted position by means of the screws *a b*. The form is connected with a jack, having a bed-plate, D, and swivel-plate E, by means of the axial pin *c*, which passes through the cheeks *d d* of the piece A of the form, and the projection *e* of the swivel-plate E of the jack, whereby, by turning the form on the pin *c*, it may be elevated to any desired height. It is held securely in its adjusted position by means of a screw, *f*, which tightens against an arm, F, which is concentric for a part of its length with the said joint-pin *c*.

The form may be turned around to bring any part in front, the swivel-plate turning on a projection of the bed-plate D.

To assist in holding while adjusting and pasting the linings and quarters accurately, they are held on the form by means of the side clasps G G and front clasp H, the side clasps being connected to the cap-piece C. The clasp H is held by means of the screw *g*. The clasp H serves, also, as a guide for fitting or placing the vamp on the quarters, giving the proper amount of lap, there being a slot in its upper end, which admits of its longitudinal adjustment, and a scale of sizes marked along this slot. The lines 1 2 3 4 5 on the form are guides for fitting the quarters of different sizes.

The operation of the device is as follows: For the smallest size shoes to which the form is adapted, the pieces B and C rest against the flat face of the piece A, along the line *y y*, as seen in Fig. 1; and for the larger sizes the form is expanded accordingly, and when the linings are being fitted and pasted to the quarters the spring-clasps G G and H are used, as may be found desirable, for holding the same, or they may be held by the hand. For what are termed machine-shoes, the quarters are pasted on the table and the lining laid inside; then the lining and quarters are placed on the form with the lining inside, the spring-clasps being used to hold the parts in place upon the form as may be necessary, care being taken to have the front seam even with the groove *h*. (Seen in Fig. 3.) Then the quarters are adjusted and pasted to the lining, and removed from the form for the purpose of stitching, preparatory to vamping. A rubber may be used for pressing down the seam, lining, and the quarters, as may be necessary to make a perfect fit to the form. After any desirable number of quarters have thus been prepared for vamping, the cap-piece C is removed from the piece B. It is necessary to remove the cap-piece in order to remove the uppers from the form after vamping. The spring-clasp H is then applied to the upper end of the piece A of the form, and connected thereto by means of the fastening-screw *k*, as seen in Fig. 2, and so adjusted as to be a guide for setting the edge of the vamp to give the proper amount of the lap. Expert operators may hold the parts to the form without using the clasps.

The operation above described applies to the classes of shoes termed machine and welted shoes. In fitting the uppers of turned shoes the same process is pursued, with the exception that the quarters are first placed on the form with linings outside of the quarters, and the linings are adjusted and pasted on them. Then they must be turned before they are vamped.

Having thus described my invention, what I claim as new, and desire to secure by Letters Patent, is—

1. As an improvement in the art of manufacturing boots and shoes, the process of fitting the parts of uppers over a form, and holding the same thereon while they are being pasted and adjusted, for the purpose set forth.

2. The improvement in the manufacture of boots and shoes, the same consisting in placing the prepared quarters and linings over a form, and adjusting them preparatory to stitching, for the purpose set forth.

3. The improvement in the manufacture of boots and shoes, the same consisting in placing stitched quarters and linings over a form, and adjusting the vamp preparatory to stitching, for the purpose set forth.

4. As a new article of manufacture, apparatus over which boot and shoe uppers are vamped and fitted, the same consisting of a form shaped to the requirements of the boot or shoe, and provided with clasps to assist the operator in holding the parts in place, substantially as set forth.

5. A form for fitting and holding boot and shoe uppers, consisting of the sectional parts A and B, relatively adjustable, and provided with the guide H, substantially as and for the purpose set forth.

6. The removable cap-piece C, provided with clasps G and guide H, in combination with the parts A and B, substantially as and for the purpose set forth.

7. The holder H, in combination with the front piece B of the form, substantially as and for the purpose set forth.

8. The side clasps G G, in combination with the form A B C, substantially as and for the purpose set forth.

9. The form for fitting and holding shoe-uppers, when provided with cheeks *d d* and screw *f*, substantially as and for the purpose set forth.

W. J. B. MILLS.

Witnesses:
JOHN A. WIEDERSHEIM,
A. P. GRANT.